United States Patent
Iizuka et al.

[11] Patent Number: 5,295,020
[45] Date of Patent: Mar. 15, 1994

[54] LENS ASSEMBLING STRUCTURE

[75] Inventors: Takashi Iizuka; Ryota Ogawa, both of Tokyo, Japan

[73] Assignee: Asahi Kogaku Kogyo Kabushiki Kaisha, Tokyo, Japan

[21] Appl. No.: 789,819

[22] Filed: Nov. 12, 1991

Related U.S. Application Data

[63] Continuation of Ser. No. 519,589, May 7, 1990.

[30] Foreign Application Priority Data

May 8, 1989 [JP] Japan ................................ 1-113629

[51] Int. Cl.⁵ .................................................. G02B 7/02
[52] U.S. Cl. ................................. 359/811; 359/815; 359/819
[58] Field of Search .............. 305/245, 247, 248, 257, 305/427, 429, 469, 500; 350/409, 412, 417, 252, 255, 257, 253, 475; 359/811–830

[56] References Cited

U.S. PATENT DOCUMENTS

| | | | |
|---|---|---|---|
| 4,413,888 | 11/1983 | Sato | 350/469 |
| 4,844,602 | 7/1989 | Kitagishi et al. | 350/500 |
| 4,848,883 | 7/1989 | Maruyama | 350/427 |
| 4,886,342 | 12/1989 | Kudo et al. | 350/475 |

FOREIGN PATENT DOCUMENTS

| | | | |
|---|---|---|---|
| 298058 | 1/1989 | European Pat. Off. | 359/819 |
| 906278 | 9/1962 | Fed. Rep. of Germany | 350/252 |
| 177506 | 10/1984 | Japan | 350/252 |
| 167902 | 7/1986 | Japan | 350/409 |
| 204208 | 8/1988 | Japan | 359/819 |
| 74910 | 3/1990 | Japan | 359/819 |
| 995054 | 2/1983 | U.S.S.R. | 359/879 |

*Primary Examiner*—Scott J. Sugarman
*Assistant Examiner*—Thong Nguyen
*Attorney, Agent, or Firm*—Sandler, Greenblum & Bernstein

[57] ABSTRACT

A lens assembling structure including a lens system and a holding member for holding each lens element, a particular lens element in the lens system including a lens function surface and an abutting surface. The abutting surface is designed such that an inclination center due to decentering is located on the optical axis and at a point where aberration deterioration due to inclination is reduced.

6 Claims, 4 Drawing Sheets

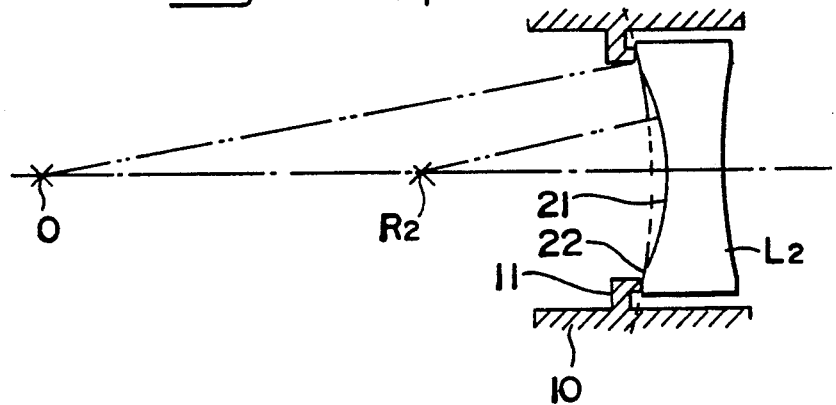
Fig. 4
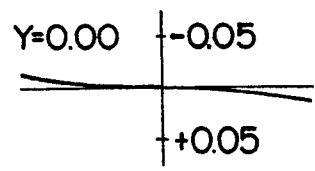 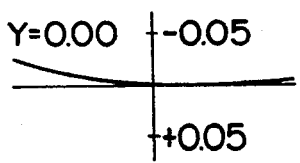 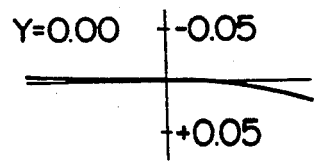
Fig. 5    Fig. 6    Fig. 7
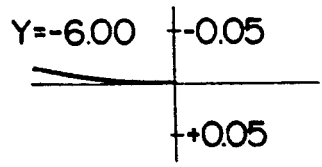 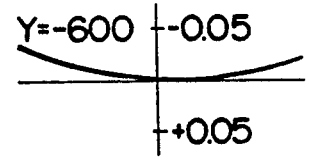 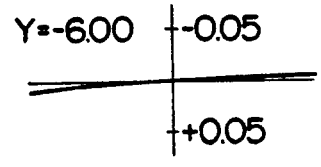
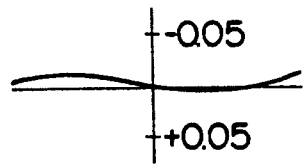 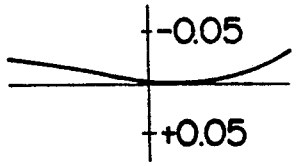 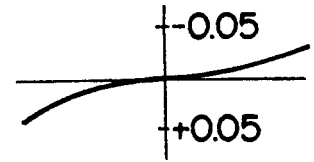
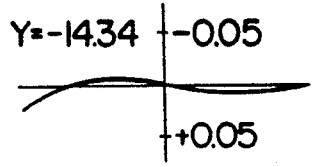 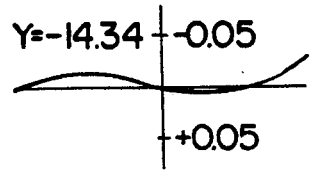 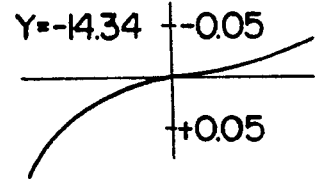

LENS ASSEMBLING STRUCTURE

This application is a continuation of application Ser. No. 07/519,589, filed May 7, 1990, now abandoned.

BACKGROUND OF THE INVENTION

1. Field of the Invention

This invention relates to an assembling structure when a lens is assembled to a holding member such as lens barrel, and more specifically to a lens assembling structure which is hardly adversely affected even when the lens is decentered from a regular position by decentering, etc.

2. Description of the Prior Art

When a lens L is assembled to a holding member 10, one end face of the lens L, as shown in FIG. 8, abuts against the holding member 10 and the other end face is secured to the holding member 10 by a ring screw (not shown).

If the lens L is assembled to the holding member 10 in this manner, when the lens L is decentered caused by assembling errors or vibrations, the lens L is inclined about the center R2 of curvature of the abutting surface against the holding member 10. The term "decentering" when used herein refers to a movement perpendicular to the optical axis of the lens L, and the term "inclination" refers to a rotational motion of the lens L which is caused to move in such a manner as to have an angle between the optical axis of the lens L and the optical axis of a whole lens system by the decentering.

However, when the lens is rotated about the center of curvature, the rotation of the lens acts in such a manner as to increase the generation of aberration. As a result, there is a high possibility that performance of the lens system deteriorates.

Particularly, when the lens is formed of a material having a large coefficient of expansion such as plastic, it is necessary to reserve a large clearance in order to avoid generation of warp caused by rising of the internal pressure of the lens which is caused by expansion of such material. Therefore, a problem is caused when decentering occurs, since the decentering amount is large and deterioration of the lens system is great.

SUMMARY OF THE INVENTION

The present invention has been accomplished in view of the above problem. It is therefore the object of an invention to provide a lens assembling structure which is capable of rotating a lens in the direction of offset the adverse effect of the performance of the lens caused by the decentering, even when a particular lens in a lens system is decentered.

A lens assembling structure according to the present invention is characterized in that an abutting surface to a holding member of a particular lens in a lens system is designed such that the center of inclination of the particular lens resulting from decentering is positioned on the optical axis of the lens system where aberration deterioration caused by inclination is less that is, the aberration deterioration caused by inclination is minimized.

BRIEF DESCRIPTION OF THE DRAWINGS

FIG. 4 is an explanatory view showing an assembling structure to a holding member of a second lens.

FIGS. 5 to 7 show transverse aberrations according to the lens system of FIG. 2, FIG. 5 shows a state of no inclination. FIG. 6 shows a state in which the lens is inclined about a point of less aberration deterioration, and FIG. 7 shows a state in which the second lens is inclined about point R2 in FIG. 4.

DETAILED DESCRIPTION OF THE EMBODIMENTS

Figure 1:
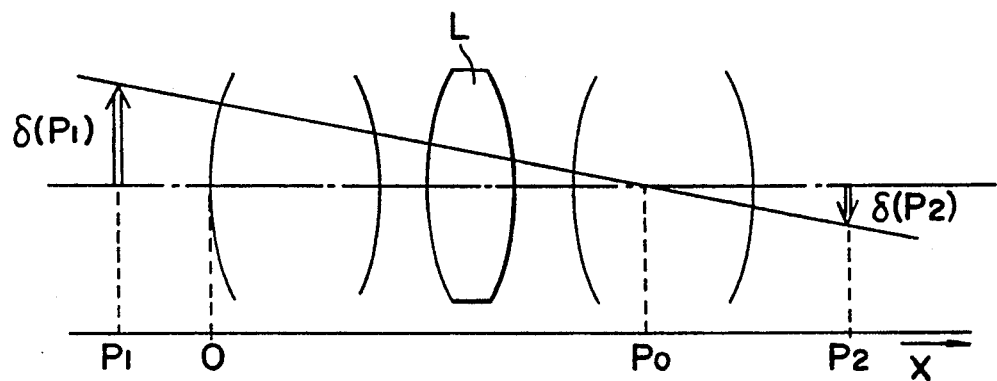
FIG. 1 is an explanatory view showing the principle of a lens assembling structure according to the present invention.

As is shown in FIG. 1, which is a schematic view illustrating the change of aberration when a lens inclines. Character X denotes the coordinate in the direction of an optical axis. When a lens L is inclined about a particular point on the optical axis, if attention is paid to a certain aberration, a changed amount $\delta$ of the aberration caused by the inclination can be approximated by a linear equation with respect to the x-coordinate on the optical axis. Therefore, by finding the changed amount $\delta(P1)$ of the aberration when the lens is inclined about a point P1 in front of the lens, and the changed amount $\delta(P2)$ of the aberration when the lens is inclined about a point P2 behind the lens by ray tracing, an inclination center $(x=P0)$ of the lens can be found which does not cause certain aberration even when lens L is inclined.

An example of the use of the linear equation will now be described. It is known that when inclination of the lens is small, an amount of change of aberration $\delta$ is proportional to a coordinate of a center of inclination. This relationship is shown by the following equation:

$$\delta(x) = a(x-b)\theta,$$

where
- $\delta(x)$ is the amount of change of aberration
- a is a constant
- x is the x-coordinate of the center of inclination
- b is a constant which is equal to the distance between points O and $P_o$ in FIG. 1
- $\theta$ is the angle of inclination FIG. 1 shows a lens structure and an amount of change of aberration. If the angle of inclination $\theta$ is fixed, $\delta(P_1)$ and $\delta(P_2)$, which are the changes of aberration when the inclination center is positioned at $P_1$ and $P_2$, are obtained by known methods of ray tracking. It also may be considered that the change of aberration is proportional to the coordinate of the center of inclination when the $\theta$ is fixed.

Therefore, the following two equations may be obtained. And from the equations, the constants a and b may be determined.

$$\delta(P_1) = a(P_1 - b)\theta$$

$$\delta(P_2) = a(P_2 - b)\theta$$

Since the constants a and b are determined, the coordinate x where the change of aberration $\delta(x)$ is minimized can be found.

Further, if there are two or more aberrations which must be paid attention, the center of the inclination is decided so that the balance of affections to any aberrations is kept after finding P0 of each aberration.

When a lens L is decentered, and inclined about point P0, aberration due to the inclination does not occur.

Figure 2:
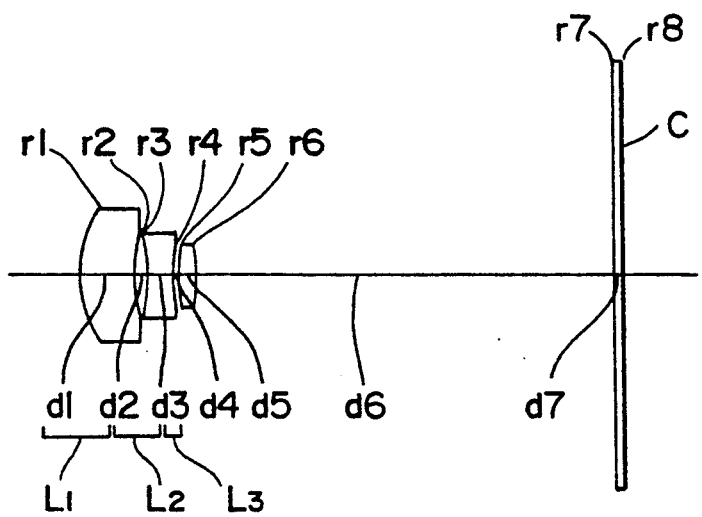
FIG. 2 is a lens diagram showing a first embodiment of a lens system according to the present invention.

FIG. 2 shows the sectional view of the lens system according to the embodiment, and concrete numerical values are as shown in Table 1. In the table, the reference character FNo. denotes a F-number, f denotes a focal length of the lens system in which the wavelength of the light is substantially in the center of the useable light spectrum, M denotes a magnification, r denotes the radius of curvature of a surface, d denotes a lens thickness or a spatial distance, n denotes a refractive index in substantially the center of the useable light spectrum, $\nu d$ denotes an Abbe number.

This lens system comprises a first positive lens L1, a second negative lens L2, a third positive lens L3 and a cover glass C. It is a reading lens which is often used in an optical system for a facsimile machine, etc.

Figure 3:
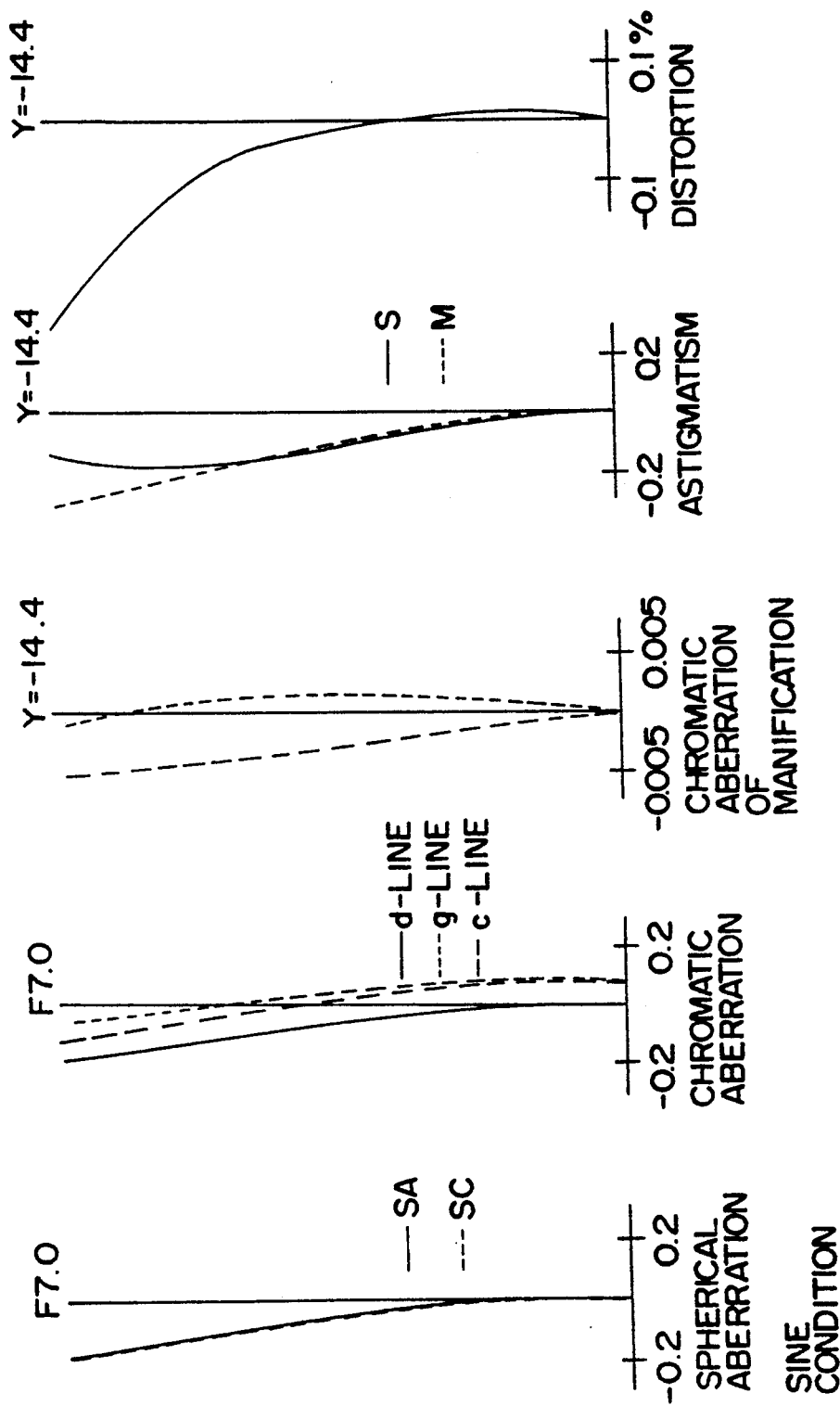
FIG. 3 includes various aberration diagrams of the lens system shown in FIG. 2.

The spherical aberration, chromatic aberration, astigmatism, and distortion in the above-mentioned construction in which the lens is not decentered is shown in FIG. 3.

TABLE 1

| FNO. = 1:7.0 | | f = 29.87 | M = −0.112 | |
|---|---|---|---|---|
| surface NO. | r | d | n | $\nu d$ |
| 1 | 8.190 | 3.80 | 1.49186 | 57.4 |
| 2 | 12.181 | 0.75 | | |
| 3 | −14.500 | 1.80 | 1.58547 | 29.9 |
| 4 | 9.471 | 0.37 | | |
| 5 | 14.400 | 1.19 | 1.88300 | 40.8 |
| 6 | −18.980 | 28.77 | | |
| 7 | ∞ | 0.50 | 1.51633 | 64.1 |
| 8 | ∞ | | | |

In this embodiment, the second lens L2 is a particular lens which is inclined about a point of less aberration deterioration when decentering occurs.

FIG. 4 is a view schematically showing an assembling structure of the second lens L2 to the holding member 10. The cylindrical holding member 10 is provided with a projecting portion 11 projecting inwardly. The second lens L2 abuts against the projecting portion 11. A surface of the second lens L2 on its projecting portion 11 side comprises a lens function surface 21 which is the portion of the lens where light passes through, and an abutting surface 22 to abut against the holding member 10 and forming the peripheral portion of the lens surface 21. The abutting surface 22 is a spherical surface having a different curvature from that of the lens function surface 21. And this abutting surface 22 is designed such that when the second lens L2 is decentered, the second lens L2 is inclined about a point of less aberration deterioration.

It is to be noted that the abutting surface 22 is not indispensable. Also, it may be of a curved surface other than the spherical surface. The above-mentioned lens shape can be easily obtained if the lens is formed of plastic.

When the second lens L2 is disposed with its abutting surface 22 abutting against the projecting portion 11, the inclination center 0 of the second lens L2 is a point 52.45 mm away from a third surface to a subject side.

The transverse aberration when the lens is not inclined is shown in FIG. 5. When the second lens L2 is decentered by 50 μm about the point 0, the transverse aberration changes as shown in FIG. 6.

Figure 8:
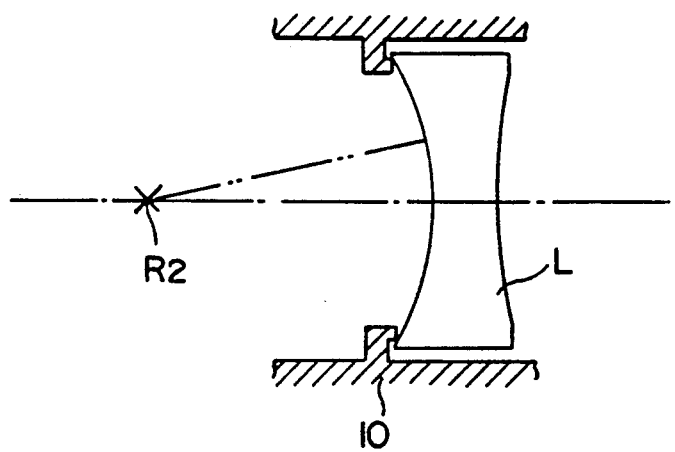
FIG. 8 is an explanatory view showing the conventional lens assembling structure.

On the other hand, if the second lens L2 is disposed with its lens function surface 21 abutted against the holding member 10 as the prior art of FIG. 8, the inclination center of the second lens L2 becomes a point 14.50 mm away from the third surface to the subject side (center of curvature of the third surface). In the foregoing state, when the second lens L2 is decentered by 50 μm, the transverse aberration is deteriorated as shown in FIG. 7.

Comparison of the foregoing reveals that the amount of aberration deterioration with respect to the same amount of the decentering is significant when the lens is inclined about the center of curvature of the lens function surface.

As described in the foregoing, according to the present invention, as the inclination center due to decentering of a lens is set to a point of less aberration deterioration caused by inclination of the lens, the adverse affection from aberration can be reduced even when the lens is inclined.

Therefore, even when the assembling clearance to the holding member of the lens is formed large in order to use a plastic lens having a large coefficient of expansion, performance deterioration caused by decentering can be reduced.

What is claimed is:

1. A lens assembling structure including a lens system and a holding member for holding each lens element of said lens system, said structure comprising:
    a lens element in said lens system including a curved lens function surface that allows light to pass therethrough, and a curved abutting surface for abutting against said holding member, said abutting surface being designed such that an inclination center of said lens element is located on an optical axis of said lens system and at a point where aberration deterioration due to inclination and decentering of said lens element is reduced, and said abutting surface having a different radius of curvature from that of said lens function surface.

2. A lens assembling structure according to claim 1, wherein said abutting surface is a spherical surface.

3. A lens assembling structure according to claim 1, said abutting surface and said lens function surface being spherical, wherein said inclination center is farther from said lens element than the center of curvature of said lens function surface.

4. A lens assembling structure including a lens system and a holding member for holding each lens element of said lens system, said structure comprising:
    a lens element in said lens system including a curved lens function surface which allows light to pass therethrough, and a curved abutting surface disposed at the periphery of said lens function surface and adapted to abut against said holding member, said abutting surface being designed such that an inclination center of said lens element is located on an optical axis of said lens system and at a point where aberration deterioration due to inclination and decentering of said lens element is reduced, and said abutting surface having a different radius of curvature from that of said lens function surface.

5. A lens assembling structure comprising a first positive lens, a second negative lens, and a third positive lens arrange sequentially from a subject to form a whole lens system, and a holding member for holding each lens element, said second lens including a curved lens function surface which allows light to pass therethrough, and a curved abutting surface disposed at the periphery of said lens function surface and adapted to abut against said holding member, said abutting surface being designed such that an inclination center of said lens element is located on an optical axis of said whole lens system and at a point where aberration deterioration due to inclination and decentering of said second lens is reduced, and said abutting surface having a different radius of curvature from that of said lens function surface.

6. A lens assembling structure according to claim 5, said abutting surface and said lens function being spherical, wherein said inclination center is farther from the second lens than the center of curvature of said lens function surface.

* * * * *